July 14, 1970

W. D. ALLISON 3,520,553

MOTOR VEHICLE REAR SUSPENSION SYSTEM HAVING CORRECTIVE STEERING

Original Filed Dec. 14, 1968

INVENTOR.
WILLIAM D. ALLISON
BY John R. Faulkner
Clifford L. Sadler
ATTORNEYS

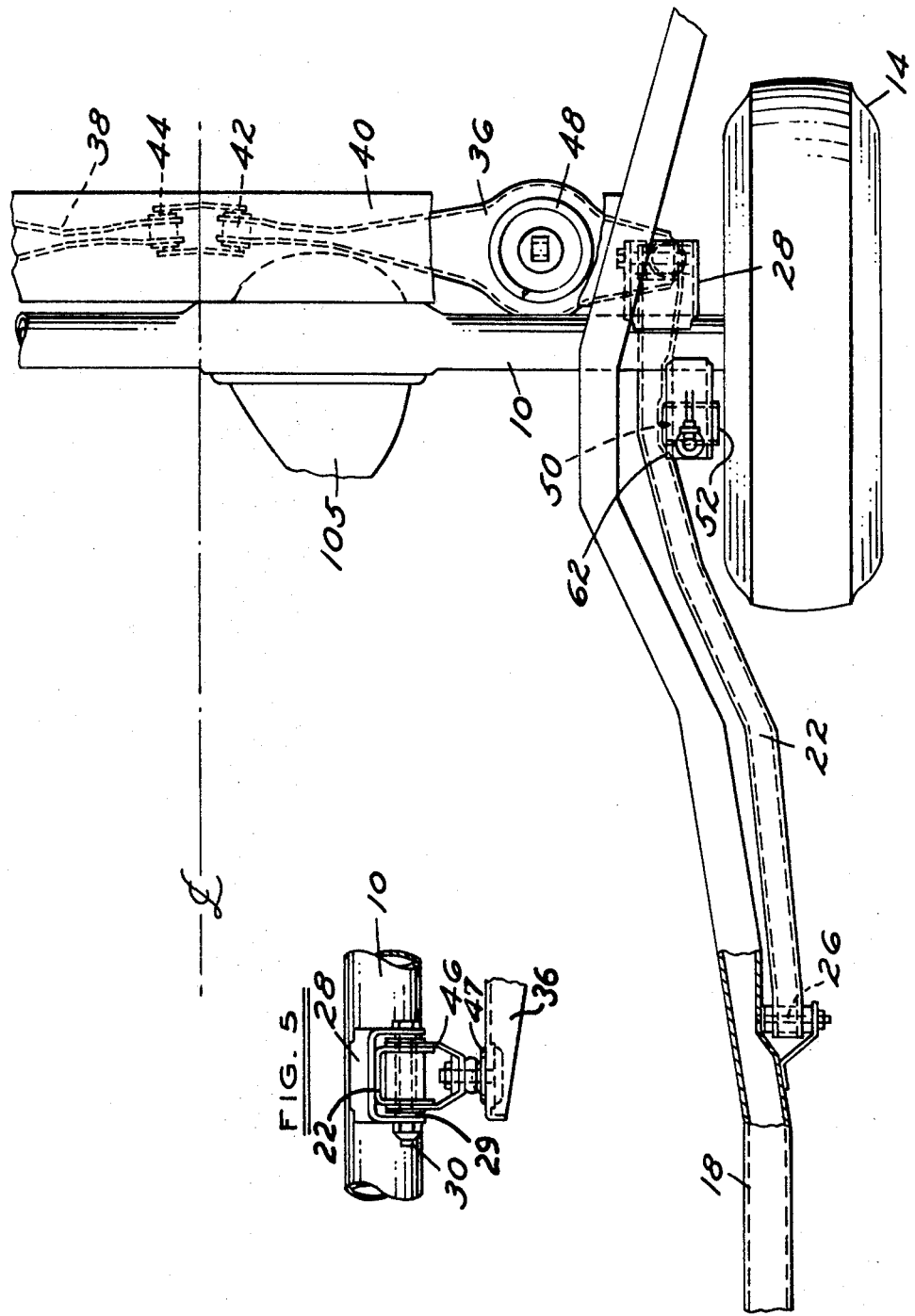

United States Patent Office 3,520,553
Patented July 14, 1970

---

3,520,553
MOTOR VEHICLE REAR SUSPENSION SYSTEM HAVING CORRECTIVE STEERING
William D. Allison, Grosse Pointe Farms, Mich., assignor to Ford Motor Company, Dearborn, Mich., a corporation of Delaware
Original application Dec. 14, 1967, Ser. No. 690,594. Divided and this application June 26, 1968, Ser. No. 740,187
Int. Cl. B60g 9/00
U.S. Cl. 280—124                    7 Claims

ABSTRACT OF THE DISCLOSURE

A motor vehicle suspension system having a solid rear axle housing with a pair of trailing suspension arms pivotally connected to the vehicle chassis and the axle. A pair of lateral arms have their inner ends pivotally connected to the chassis and their outer ends linked to the axle housing. This structure permits lateral displacement of the vehicle body with respect to the axle housing. The trailing arms are angled forwardly and outwardly so that when the lateral displacement occurs in response to a lateral force, the axle housing will cant in the direction of understeer.

BACKGROUND OF THE INVENTION

This application is a division of my earlier filed copending U.S. patent application Ser. No. 690,594, filed Dec. 14, 1967 and entitled "Motor Vehicle Rear Suspension System."

In a conventional automobile, rotation of the engine crankshaft and related components produces a torque reaction that is transmitted to the body through the engine mounts. The body tends to rotate in a clockwise direction (when viewed from the rear) in accordance with the counterclockwise rotation (viewed from the rear) of the crankshaft. This increases the loading on the left rear wheel which, in turn, produces an equal decrease in loading of the right rear wheel. The end result is a reduction in traction at the right rear wheel and possible spinning of the wheel during acceleration.

In view of the foregoing problem, it is one of the objects of this invention to provide a rear suspension system for a motor vehicle that counteracts the engine torque so as to provide equal traction between the rear driving wheels.

It is also an object of the present invention to provide an improvement in rear suspension systems of the type disclosed in my U.S. Pat. 3,171,642, entitled "Vehicle Wheel Suspension Having Lateral Compliance." A vehicle suspension system constructed in accordance with the present invention has superior handling and cornering ability and is particularly characterized by its lateral compliance and its side thrust understeer. The invention teaches a rear suspension system that is so constructed and arranged that when a side force is applied to the sprung mass, the rear of the vehicle is displaced sideways relative to the rear axle. This lateral displacement is known in the art as lateral compliance. Lateral compliance is desirable because it reduces ride harshness and side shake. The suspension is also characterized by the canting of the axle in the direction of understeer in response to the lateral compliance.

BRIEF SUMMARY OF THE INVENTION

In the presently preferred embodiment, a rear suspension system for a motor vehicle has a pair of trailing suspension arms that are pivotally connected to the vehicle body and to a rigid axle housing. A double acting hydraulic cylinder is interposed between each arm and the axle housing. The cylinders have pressure chambers situated above and below the reciprocable piston in the cylinders. The two lower chambers are interconnected by a hydraulic line and the two upper chambers are interconnected by a separate hydraulic line. The upper chamber for the right suspension arm has a greater cross sectional area than the left upper chamber due to the fact that its piston rod is substantially smaller in diameter than the piston rod for the left hydraulic cylinder. The hydraulic line interconnecting the two upper pressure chambers is expansible to accommodate fluid displacement resulting from the difference in piston rod diameters.

When driving torque is applied to the axle, the torque is transmitted to the suspension arms through their pivotal connection with the axle and the hydraulic cylinders. In forward acceleration, the hydraulic fluid in the upper chambers is compressed. The upper chambers have unequal areas of fluid under pressure due to the difference in the diameter of the two piston rods. The right side cylinder, having the smaller rod, has a greater fluid area and thus exerts a force on the right side suspension arm that is greater than the force exerted by the left side cylinder. The difference in forces applied to the suspension arms by the cylinders results in a corresponding difference in vertical reaction forces to the body at the front ends of the suspension arms. The right side arm lifts more than the left side arm and results in a counterclockwise (when viewed from the rear) to the body which can be designed to be exactly equal and opposite to the clockwise torque transmitted to the body through the engine mounts. This equalizes the loading on the tires and has the end result of providing equal traction during forward acceleration.

In addition, a pair of laterally extending arms have their inner ends pivotally connected to the vehicle frame and their outer ends linked to axle housing brackets by means of articulated swivels or shackles. The vehicle's main suspension springs are interposed between the lateral arms and the vehicle frame. The previously mentioned trailing arms diverge in a forwardly and outwardly fashion.

The construction of the connection between the lateral arms and the chassis and the construction of the swivels connecting the outer ends of the lateral arms to the axle permits the vehicle body and frame to move laterally a small amount with respect to the axle housing in response to a lateral force. Because the trailing suspension arms are angled forwardly and outwardly, displacement between the vehicle body and axle housing cants the rear wheels in the direction of understeer. This is sometimes referred to as automatic corrective steering and occurs during a cornering maneuver whereby stability of the vehicle is increased.

BRIEF DESCRIPTION OF THE DRAWINGS

The many objects and advantages of the present invention will become apparent upon consideration of the following description and the accompanying drawings, in which:

FIG. 4 is a top plan view of the suspension system shown in FIGS. 1 and 3; and

FIG. 5 is an enlarged view showing the pivotal connection between a lateral arm of the suspension system and the axle housing.

DETAILED DESCRIPTION OF THE INVENTION

Figure 1:
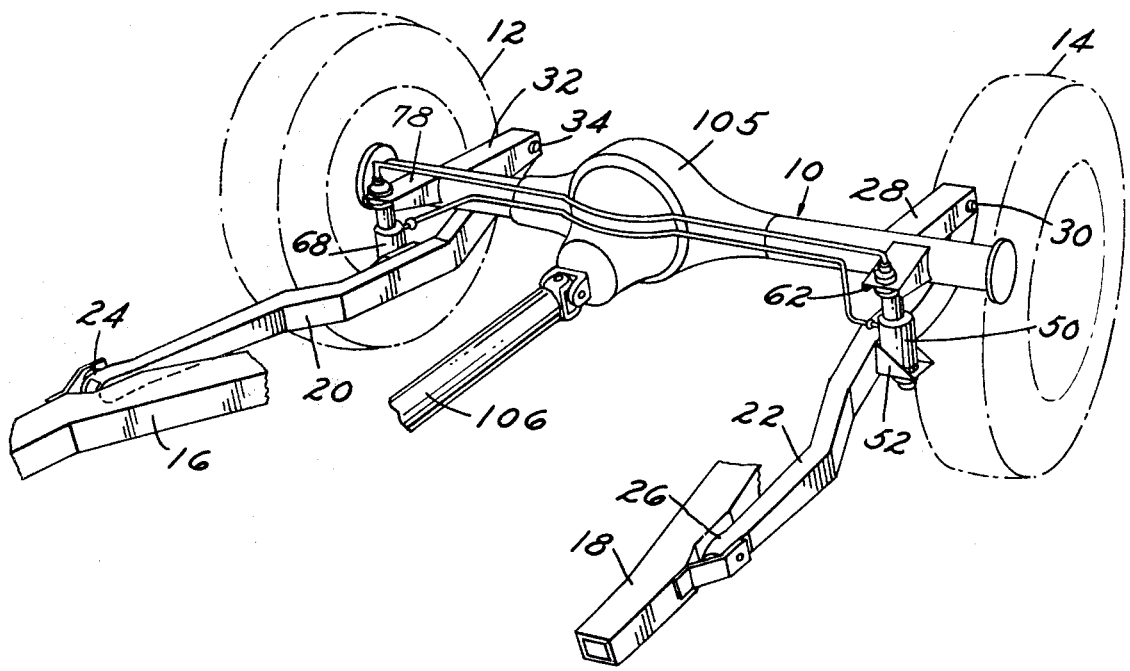
FIG. 1 is a perspective view of a portion of a rear suspension system for a motor vehicle incorporating the present invention.

Referring now to the drawings, wherein the presently preferred embodiment of this invention is illustrated, FIG. 1 discloses a rear suspension system for a motor vehicle having an axle housing 10 to which driving wheels 12 and 14 are rotatably connected at its outer ends. The axle housing 10 is connected to frame side rails 16 and 18 by means of trailing suspension arms 20 and 22. The suspension arm 20 on the right side of the vehicle is connected to the right frame rail 16 by means of a pivot 24. Similarly, the left arm 22 is pivotally connected at 26 to the left frame rail 18.

The suspension arms 20 and 22 may also be referred to as torque arms due to the nature of the connection between arms 20, 22 and the axle housing 10. A connection is provided which permits torque reaction to be transmitted from the axle housing 10 through the arms 20, 22 to the frame members 16, 18.

Figure 3:
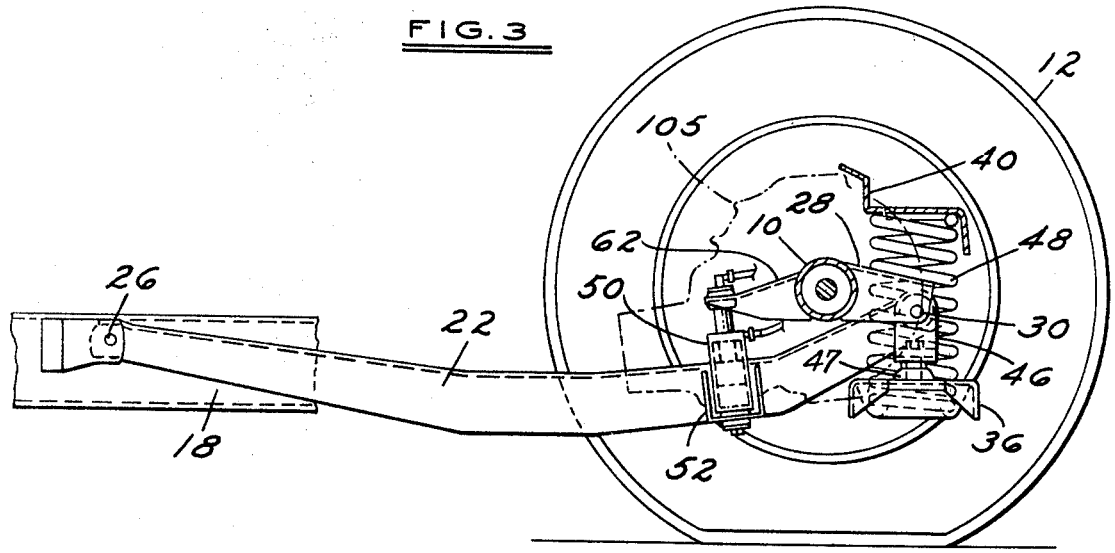
FIG. 3 is a side elevational view, partly in section, of the suspension system of FIG. 1.

A bracket 28 is rigidly welded to the axle housing 10 and extends rearwardly therefrom. The bracket 28 provides support for a rubber bushing 29 and a pivot pin 30 that is connected to the rear end of the left suspension arm 22. As seen in FIG. 3, the arm 22 has a generally bowed shape and extends from its forward pivot 26 rearwardly beneath the axle housing 10 to its connection at 30 with the rear of the bracket 28. The right suspension arm 20 has a similar connection to the axle housing 10. A bracket 32 extends rearwardly from the housing 10 and has a pivotal connection at 34 with the rear extremity of the right arm 20. The right arm 20 is also bowed and extends beneath the axle housing 10.

Means are provided to control the lateral position of the axle housing 10 with respect to the vehicle frame. Referring to FIG. 4, a pair of laterally extending suspension arms 36 and 38 have their inner ends pivotally connected to a frame cross member 40 by resilient bushings 42 and 44. The outer end of the left lateral arm 36 is connected to the axle housing bracket 28 by means of a swivel 46 which is shown in greater detail in FIG. 5. The swivel 46 pivots about the axis of pin 30 and is connected to the arm 36 by means of a ball and socket joint 47.

In a similar manner, the right lateral arm 38 has its outer end connected to the axle housing bracket 32 by means of a swivel construction such as illustrated in FIG. 5.

A coil spring 48 has its upper end seated against the frame cross member 40 and its lower end positioned in a spring pocket formed in the left lateral arm 36. A second coil spring (not shown) is located between the frame member 40 and the lateral suspension arm 38 for the right side of the vehicle. These two coil springs resiliently support the body and chassis of the vehicle upon the axle housing 10 and the road wheels 12 and 14. A pair of conventional telescopic shock absorbers may be interposed between the axle housing 10 and the frame to damp jounce and rebound movement of the wheels 12 and 14. In order to avoid undue complication of the drawings, these shock absorbers are not illustrated.

Figure 2:
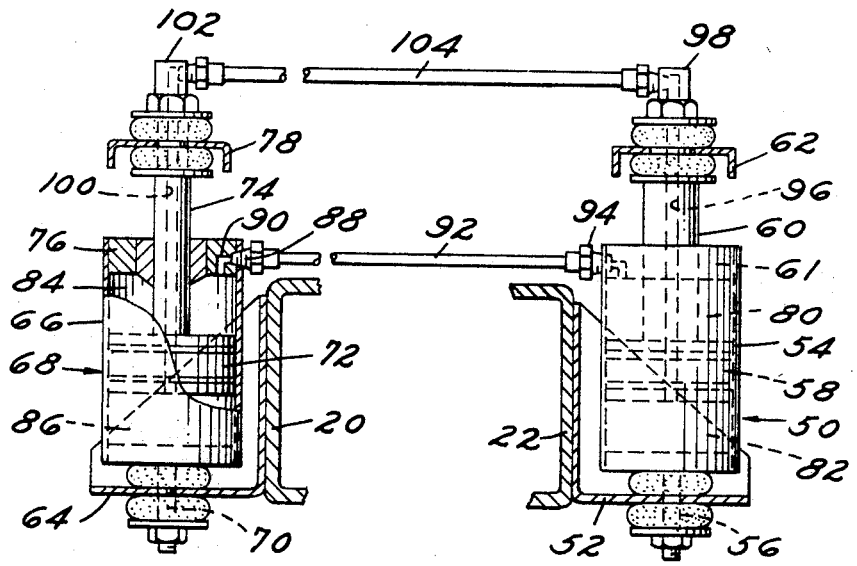
FIG. 2 is a front elevational view, partly in section, of the hydraulic portion of the suspension system in FIG. 1.

In accordance with the present invention, means are provided to control the transmission of torque from the axle housing 10 to the suspension arms 20 and 22. A double acting hydraulic cylinder 50 has its lower end secured to a bracket 52 that is welded to the left-hand suspension arm 22. As seen in FIG. 2, the hydraulic cylinder 50 includes a cylindrical body portion 54 that has its lower end connected to the bracket 52 by means of a threaded fastener and rubber elements as indicated generally in 56. A piston 58 is reciprocably mounted within cylinder 54 and has a piston rod 60 extending through a closure member 61 at its upper end. The piston rod 60 is connected to a bracket 62 that is welded to the axle housing 10.

In a similar fashion, the right suspension arm 20 has a bracket 64 secured to it which provides a support for the body portion 66 of a double acting hydraulic cylinder 68. A threaded securing device 70 that includes a pair of resilient elements connects the body 66 to the bracket 64. A piston 72 is constructed to reciprocate within the cylindrical body 66 and has a piston rod 74 extending upwardly therefrom through a closure member 76. The rod 74 is connected to a bracket 78 that is welded to the right-hand end of the axle housing 10.

The piston 58 of the hydraulic cylinder 50 divides the interior of the body portion 54 into upper and lower pressure chambers 80 and 82. In a similar manner, piston 72 divides the cylinder body 66 into an upper pressure chamber 84 and a lower pressure chamber 86. The cylinder bodies 54 and 66 have identical diameters and, therefore, the cross sectional area of the pressure chambers 82 and 86 are also identical.

The two upper pressure chambers 80 and 84 have an annular configuration due to the presence of the piston rods 60 and 74. As disclosed by FIG. 2, the piston rod 60 has a greater diameter than the piston rod 74 and, therefore, the cross sectional area of the pressure chamber 84 is greater than the cross sectional area of the annular pressure chamber 80.

Means are provided to separately interconnect the two upper pressure chambers and the two lower pressure chambers. A hydraulic fitting 88 is in communication with a passage 90 in the closure member 76 which, in turn, is open to the annular upper chamber 84 of the right hydraulic cylinder 68. The fitting 88 is connected to a flexible hose 92 that extends to a fitting 94 in the closure member 61 of the cylinder 50. The fitting 94 is in communication with the annular upper pressure chamber 80 of the left cylinder 68. With this structure, fluid can flow freely from chamber 84 to chamber 80 and vice versa.

The two lower chambers 82 and 86 are interconnected as shown in FIG. 2. The piston rod 60 of the left cylinder 50 has a central bore 96 that opens into the chamber 82 at its lower end and connects with a fitting 98 at its upper end. The piston rod 74 of the right hydraulic cylinder 68 has a central bore 100 that connects the lower chamber 86 with a hose fitting 102 at the upper end of the rod. A hose 104 joins the fittings 98 and 102 so that fluid may flow freely between the chambers 82 to 84. One or more of the hydraulic hoses 92 and 104 may be expansible under pressure. It is particularly desirable to have an expansible hose to accommodate the differences in fluid displacement resulting from the differences in diameters of the piston rods 60 and 74.

The axle housing 10 contains differential gearing within a differential housing portion 105. The propeller shaft 106 is connected to the vehicle power plant at its forward end and to gearing within the housing 105 at its rearward end. The differential gearing distributes torque through the axle shafts contained within the axle 10 to the wheels 12 and 14.

OPERATION

When driving or braking torque is applied to the axle 10, the torque is transmitted to the suspension or torque arms 20 and 22 through the hydraulic cylinders 68 and 50 situated ahead of the axle and the pivots 30 and 34 situated behind the axle. Braking in a forward direction compresses the hydraulic fluid in the lower pressure chambers 82, 86 of the cylinders 50, 68. The areas of these chambers are equal in the two cylinders and result in equal forces being applied to the suspension arms 22 and 20.

In forward acceleration, the hydraulic fluid in the upper chambers 80, 84 is compressed. The upper chambers 80 and 84 have unequal cross sectional areas of fluid under pressure due to the difference in diameters of the two piston rods 60 and 64. The cylinder 68 on the right side of the vehicle, having the smaller rod 74, has a greater fluid area and thus exerts a force on the right side suspension arm 20 greater than the force exerted by the left side cylinder 50. The difference in forces applied to the torque arms 20, 22 by the cylinders results in a corresponding difference in vertical reaction forces to the body at the front ends of the arms 20 and 22. The right side arm 20 lifts more than the arm 22 and results in a counterclockwise moment (viewed from the rear) to the body which can be designed to be exactly equal and opposite to the clockwise torque transmitted to the body through the engine mounts.

The sum of all vertical forces applied to each arm are equal, therefore, the vertical downward force at the axle attachments of the right arm is greater than that of the left arm 22. This unequal loading of the rear axle housing 10 by the suspension arms 20, 22 can provide a torque equal and opposite to the torque transmitted to the axle by the propeller shaft 106 resulting in equal load on the rear tires 12 and 14 during forward acceleration in a straight line.

The interconnection between the upper chambers 80 and 84 and the separate interconnection between the lower chambers 82 and 86 permits body roll and individual vertical wheel movement without appreciable resistance. The expansible hose provides a reservoir for the slight change in the capacity resulting from operation of two cylinders with piston rods of different diameters.

A vehicle suspension constructed in accordance with the present invention also has side thrust understeer characteristics. The rubber bushings 42 and 44 in combination with the swivel construction disclosed in FIG. 5 permits limited lateral displacement between the axle housing and the vehicle frame. As indicated in the drawings, the suspension arms 20 and 22 are angled forwardly and outwardly so that when the vehicle body moves laterally in response to a lateral force, the vehicle axle will angle slightly and the wheels 12 and 14 will assume an attitude other than straight ahead. With the arms 20 and 22 angled as they are, the attitude of the wheels 12 and 14 will be in the direction of understeer. The many advantages of a suspension system having side thrust understeer in association with a suspension having lateral compliance are described in my U.S. Pats. 3,171,642, 3,193,303 and 3,259,201.

The lateral displacement of the vehicle body is controlled by the resiliency of the bushings 42 and 44, the resiliency of the bushings at 30 and 34 connecting the swivels 46 to the axle housing brackets 28 and 32, and the fact that coil springs 48 load the swivels 46 in tension. These several elements exert forces which tend to keep the axle housing 10 in a center position.

The foregoing description presents the presently preferred embodiment of this invention. Modifications and alterations may occur to those skilled in the art that will come within the scope and spirit of the following claims.

I claim:

1. A suspension system for a motor vehicle comprising a vehicle frame structure,
   a transversely extending axle housing,
   a pair of wheels mounted at the outer ends of said axle housing,
   a first pair of suspension arms,
   first pivot means pivotally connecting said first arms to said axle housing,
   second pivot means pivotally connecting said first arms to frame structure,
   a pair of laterally extending suspension arms,
   said laterally extending arms having their inner ends pivotally connected to said frame structure,
   articulated swivel means connecting the outer ends of said laterally extending arms to said first pivot means and
   main suspension springs interposed between said laterally extending arms and said vehicle frame structure.

2. A suspension system for a motor vehicle according to claim 1 and including:
   said first suspension arms having their forward ends connected to said frame structure,
   said first suspension arms having their rearward ends connected to said axle housing.

3. A suspension system for a motor vehicle according to claim 1 and including:
   said first suspension arms having their forward ends connected to said frame structure and their rearward ends connected to said axle housing,
   said first arms diverging in a forwardly and outwardly direction.

4. A suspension system for a motor vehicle according to claim 1 and including:
   said first pivot means including resilient bushing means interposed between said swivel means and said axle housing,
   second resilient bushing means interposed between said lateral arms and said frame structure.

5. A suspension system for a motor vehicle according to claim 1 and including:
   said first suspension arms having their forward ends connected to said frame structure and their rearward ends connected to said axle housing,
   said first pivot means supporting said first suspension arms and said swivel means on said axle housing,
   said lateral arms being situated rearward of said axle housing.

6. A suspension system for a motor vehicle according to claim 1 and including:
   said first arms diverging in a forwardly and outwardly direction,
   said first pivot means including resilient bushing means interposed between said swivel means and said axle housing,
   second resilient bushing means interposed between said lateral arms and said frame structure.

7. A suspension system for a motor vehicle comprising a vehicle frame structure,
   a transversely extending axle housing,
   a pair of wheels mounted at the outer ends of said axle housing,
   a first pair of suspension arms,
   pivot means pivotally connecting said first arms to said axle housing and to said vehicle frame structure,
   said first suspension arms having their forward ends connected to said frame structure and their rearward ends connected to said axle housing,
   said first arms diverging in a forwardly and outwardly direction,
   a pair of laterally extending suspension arms,
   said lateral arms being situated rearward of said axle housing,
   said laterally extending arms having their inner ends pivotally connected to said frame structure,
   articulated swivel means connecting the outer ends of said laterally extending arms to said axle housing and
   main suspension springs interposed between said laterally extending arms and said vehicle frame structure,
   a pair of axle housing brackets secured to said axle housing on the rearward side thereof,
   said pivot means supporting said first suspension arms and said swivel means on said axle housing brackets,
   said pivot means including resilient bushing means interposed between said swivel means and said axle housing bracket,
second resilient bushing means interposed between said lateral arms and said frame structure.

References Cited

UNITED STATES PATENTS 3,049,359  8/1962  Geyer _____ 280—124
3,171,642  3/1965  Allison _____ 280—124 X

FOREIGN PATENTS 679,810  9/1952  Great Britain.

A. HARRY LEVY, Primary Examiner

U.S. Cl. X.R.

180—71; 267—20